Aug. 29, 1961 AMABLE-LOUIS COTON ET AL 2,997,945
FRICTION DRIVEN SCREW PRESSES
Filed Oct. 15, 1957 4 Sheets-Sheet 4

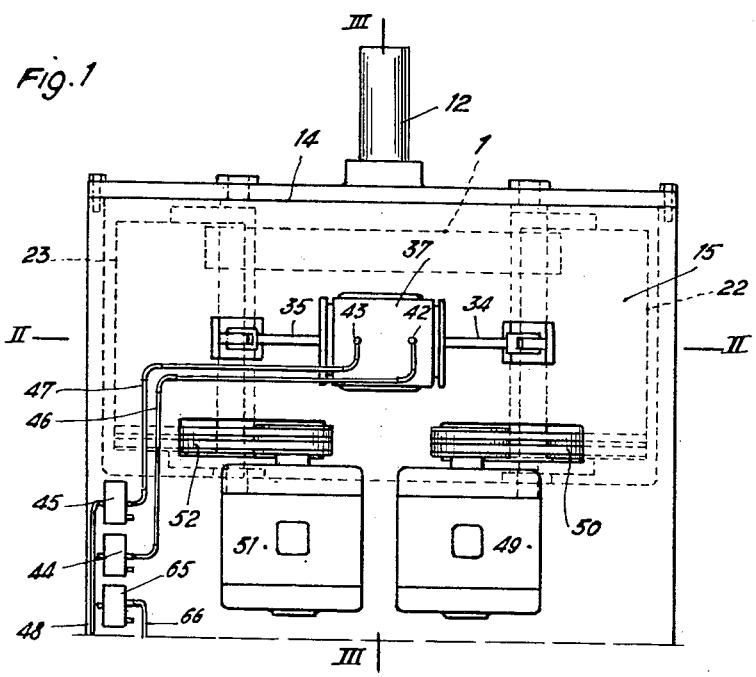
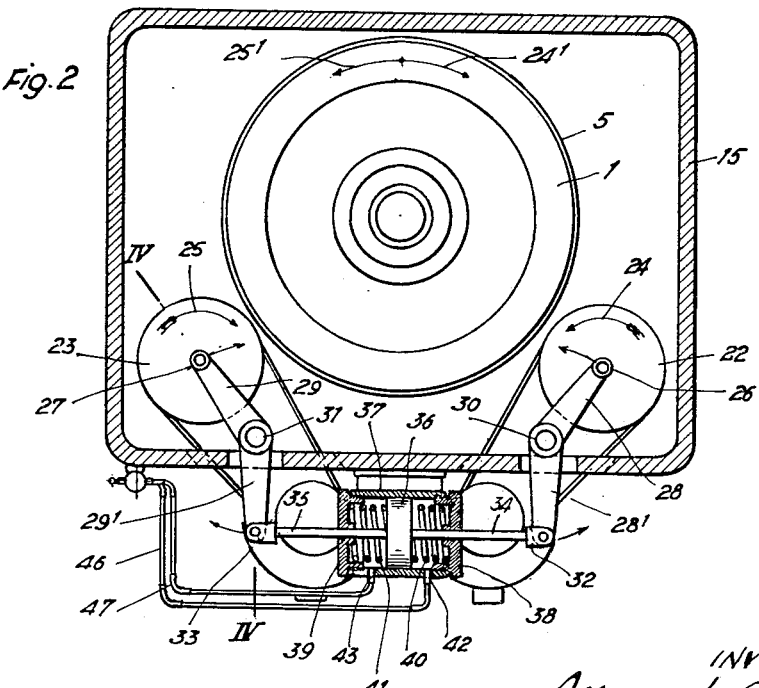

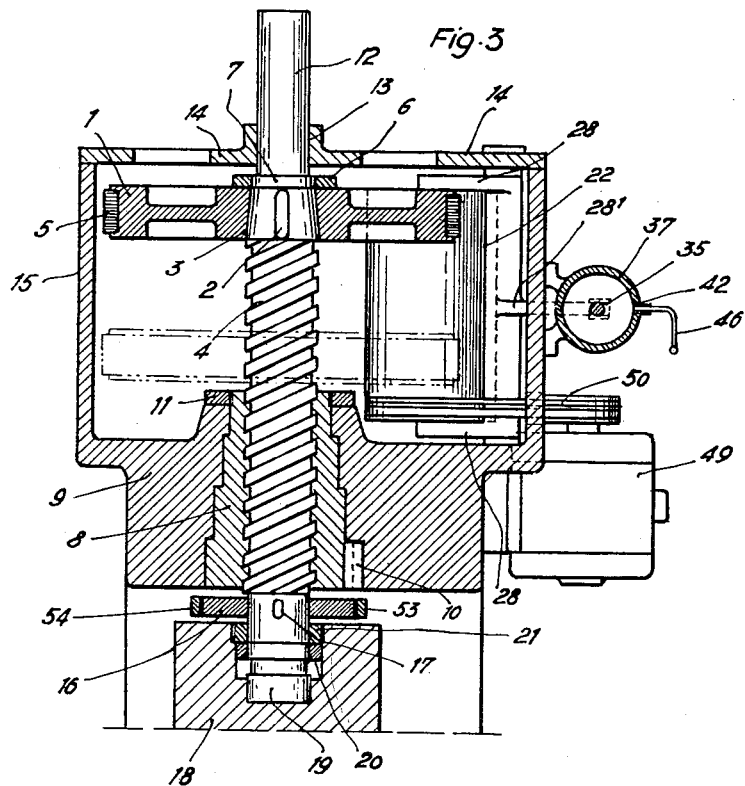

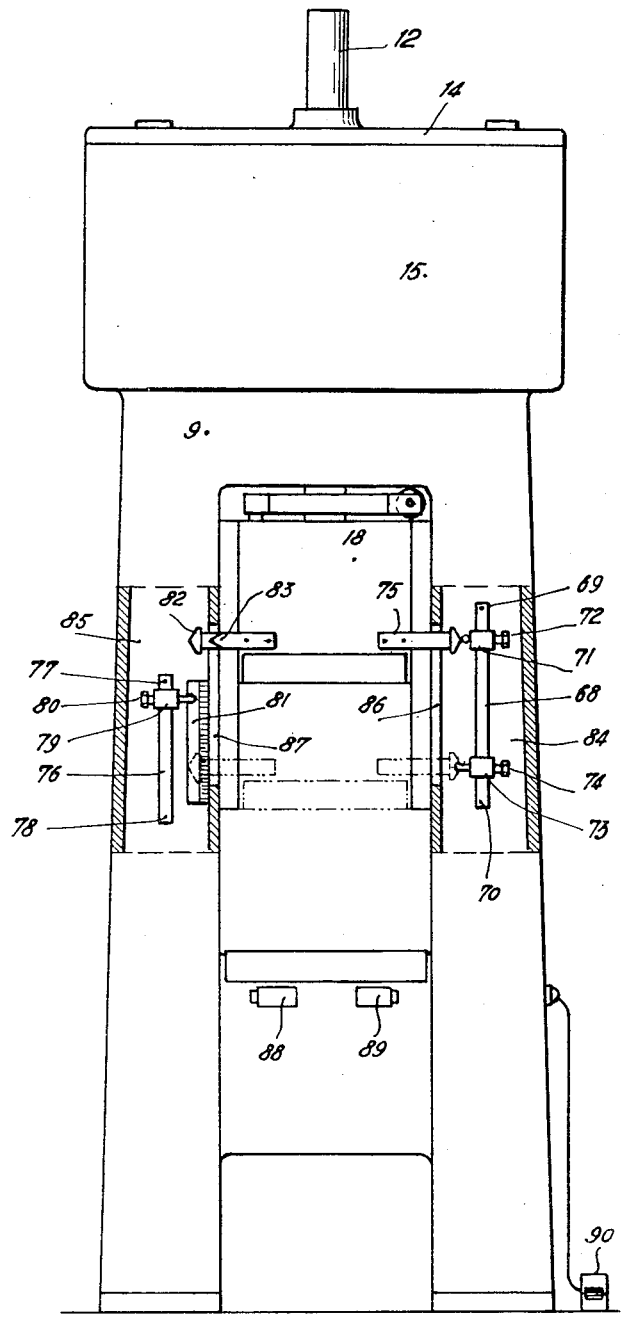

INVENTORS
AMABLE L. COTON &
ROGER MÜLLER

United States Patent Office 2,997,945
Patented Aug. 29, 1961

2,997,945
FRICTION DRIVEN SCREW PRESSES
Amable-Louis Coton and Roger Müller, Paris, France, assignors to Etablissements Grimar, Paris, France, a French company
Filed Oct. 15, 1957, Ser. No. 690,261
Claims priority, application France Nov. 9, 1956
9 Claims. (Cl. 100—256)

This invention relates to screw presses with a friction drive, and in particular to such presses of the kind in which the flywheel moves axially with the screw and the crosshead.

In machines of this kind it has hitherto been usual for the flywheel to be driven, either by discs arranged on a horizontal axis at a fixed height and alternately brought into contact with the flywheel by one of their plane surfaces, or by means of flat rollers arranged on a vertical axis and alternately brought into contact with the rim of the flywheel and following its up-and-down motion.

Driving by flat discs as indicated above requires much space, and setting of the discs by levers requires a great effort on the part of the operator while exposing him to danger from falling pieces in the case of a breakdown by fracture. Driving by rollers possesses the inconvenience of giving a mediocre performance by reason of the low, tangential velocity of the flywheel, resulting from the low ratio between the diameters of the roller and the diameter of the flywheel and the restricted speed of rotation of the rollers, such restriction resulting from the fact that they are driven through gears. Furthermore, the overhung shafts of the rollers are liable to bend by the action of the force holding them in contact with the flywheel, which is very considerable by reason of the low momentum of these rollers which even have to be supplemented by an auxiliary flywheel. This bending of the roller shafts causes bad contact with the flywheel and so the frictional driving force is diminished.

An object of the present invention is to introduce improvements in presses of the aforesaid kind; in particular for the purpose of avoiding the various drawbacks mentioned above.

Accordingly the invention provides a screw press of the kind stated principally characterized in that the flywheel is driven alternately in either direction by means of two drums on vertical spindles which are axially fixed and the dimension whereof in that direction corresponds to the amount of travel of the flywheel.

By the mere fact of this principal arrangement, the driving drums obtain a considerably greater momentum than flat rollers moving with the flywheel as hitherto employed.

It is advantageous further to increase the momentum of the drums by making them of a considerable diameter, which is easily possible, since with drums of large diameter the surface of contact with the flywheel is greater; hence an improved performance is obtained and the greater momentum enables the force holding the drum in contact with the flywheel to be less and any risk of bending or shearing of the spindles of the drums to be practically eliminated.

Preferably the flywheel and the two drums are fitted in the upper part of the press housing, within an appropriate casing provided with a cover in which the upper ends of the pivots of the drum supports and an extension of the screw spindle are guided.

This prevents any misalignment of the screw and the pivots. In addition, the casing forms an effective protection for the operator in the case of any fracture.

According to another feature of the invention, the driving drums are mounted on two supports, pivoting in opposite directions and reciprocally connected by the rod of a double-acting piston operated by pressure fluid in a cylinder, the piston being continually spring loaded to maintain a neutral position, i.e. a position in which both drums are out of contact with the flywheel. This arrangement provides a very flexible drive of the flywheel-screw-crosshead assembly.

Conveniently the drums are driven by separate motors. This arrangement, which eliminates the use of transmission gears ordinarily connecting the two drive elements in order to enable them to rotate in opposite directions, enables the drumes to be rotated at a speed much higher than that of the rollers in the previous systems, thus increasing their kinetic energy and consequently that of the flywheel without employing any greater masses.

A further important feature of the invention consists in that the system controlling the supply of pressure fluid to the double-acting cylinder performing the alternate application of the drums to the flywheel, incorporate an auxiliary contact breaker the position whereof in height is adjustable with reference to the travel of a control cam fixed on the crosshead in such a manner that according to the position or setting chosen, the drum producing the downward motion can be uncoupled from the flywheel before the end of the down-stroke of the movable parts of the press, at a variable point in the stroke; or remain coupled for the whole stroke.

This arrangement is of the greatest importance since it enables, in the case of a stamping press, the force of the blow of the machine to be varied at will and thus considerably extends the range of the work which the machine can perform.

The foregoing and other features of the invention will be apparent from the following more detailed description aided by the accompanying drawings which show an exemplary form or embodiment of a friction-driven screw press according to the invention, this particular form of embodiment being more especially contemplated for a stamping press.

FIG. 1 is a rear view of the upper part of the machine.

FIG. 2 represents a horizontal section on the line II—II of FIG. 1 (the flywheel being supposed descended below such line).

FIG. 3 is a sectional elevation on the line III—III of FIG. 1, but slightly extended downwards to show the brake and a part of the crosshead.

FIG. 4 is a detail section on the line IV—IV of FIG. 2.

FIG. 5 is a plan, in partial section, of the brake for the screw.

FIG. 6 is a front view, partially cut away, of the entire machine.

Figure 7:
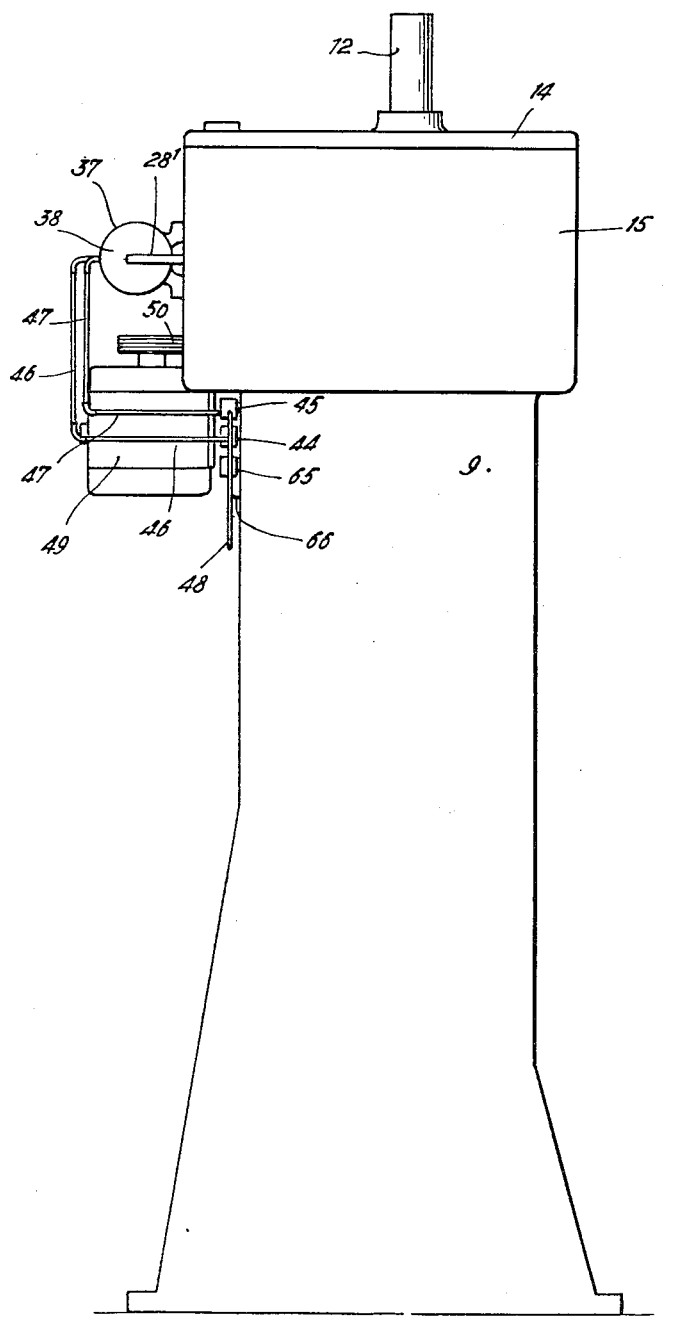
FIG. 7 is a side view corresponding to FIG. 6.

Reference numeral 1 (FIGS. 1 to 3) represents the press flywheel which is held by a key 2 on the tapered journal 3 of the screw spindle 4 and incorporates a friction lining 5. A nut 6 is fitted on a threaded portion 7 of the spindle, to hold the flywheel axially. The screw spindle 4 preferably has several threads of large pitch and passes through a nut 8 fitted in a recess of the press housing 9, this nut being prevented from turning by a key 10, while a locknut 11 holds it in position axially. The screw spindle 4 is prolonged in its upper part by a smooth cylindrical journal 12 which is guided in a bore 13 of a cover plate 14 for a casing 15 forming the upper part of the housing 9 and accommodating the flywheel. In its lower part the screw spindle 4 incorporates a journal carrying a brake pulley 16, keyed by a cotter 17, which journal passes into the crosshead 18 where it rests on a bushing or stop bearing 19 and is retained by means of a screwed ring 20 bearing on another ring 21 screwed into the cross-head.

The flywheel is driven by friction, alternately by two drums 22 and 23 (FIGS. 2 to 4) which are of a height determined by the amount of vertical travel of the flywheel and are constructed to have a large momentum enabling them, when rotated at a high speed, to impart the required kinetic energy to the flywheel. These drums rotate freely in the direction of the arrows 24 and 25 (FIG. 2) on their spindles 26 and 27 which are carried by levers 28, 28 and 29, 29, the double pivots 30, 30 and 31, 31 of each of which turn in bearings in the housing 9 and in the cover plate 14 respectively. Arms $28^1$ and $29^1$ of these levers are connected by sleeves 32 and rods 34 and 35 to a double-acting piston 36 which is movable in a cylinder 37 closed by covers 38 and 39 and which is continually constrained to return to a neutral position by opposed springs 40 and 41 the tension whereof is adjustable by screwing the covers 38 and 39 in or out. Ports 42 and 43 ensure the admission and discharge to and from the cylinder 37 of pressure fluid the distribution whereof is effected by electrically controlled valves 44 and 45 connected with the cylinder by pipes 46 and 47, the fluid being supplied from a source by a piping system 48.

A motor 49 drives the drum 22 by means of belts 50; a second motor 51 drives the drum 23 by belts 52. The belts are elastic in view of the fact that the pivots 30, 30 and 31, 31 are not in line with the axes of the belt pulleys of the motors.

To stop the rotation of the screw 4, a braking device is provided (FIG. 5) which incorporates, in conjunction with the pulley 16 already mentioned, two jaws 53 and 54 pivoting on a spindle 55 carried by the cross-head 18. The jaw 53 is attached to a cylinder 56 closed by a cover 57 in which works a piston 58 the rod 59 whereof passes through the jaw 54 and ends in a threaded portion receiving adjusting nuts 60 and 61. A spring 62 tends continually to close the jaws 53 and 54 on the pulley 16 through the intermediary of linings 63 and 64 attached to the jaws.

Pressure fluid is admitted to the cylinder 56 controlled by an electric valve 65 (FIG. 1) through a flexible pipe 66 (FIGS 1 and 5) attached to the admission port 67 of the cylinder, for the purpose of releasing the brake before the screw 4 commences to move as will be seen presently.

It is to be understood that the arrangement of the cylinder-piston-spring assembly with reference to the brake jaws, may be other than that shown, the essential feature being that the spring and the piston control the closing or opening of the two jaws simultaneously.

Referring to FIG. 6, on the right is a smooth bar 68 attached to the housing 9 by screws 69 and 70. This bar carries a limit switch 71 for the top of the stroke of the screw 4, controlling the opening of the circuit of the electrically controlled valve 44, and that of the electrically controlled valve 65. This limit switch is adjustable in height and is securable in position on the bar 68 by a screw 72. A further limit switch 73, for the bottom of the stroke, controlling the opening of the circuit of the electrically controlled valve 45 and the closing of the circuit of the electrically controlled valve 44, is adjustable similarly and is secured to the bar 68 by a screw 74. These limit switches 71, 73 are arranged to be actuated by a cam 75 attached to the cross-head 18.

On the left of FIG. 6 a device is provided to enable the striking power of the machine to be varied. This device incorporates a bar 76 attached to the housing 9 by screws 77 and 78 and carrying an electric contact breaker 79 which is movable on this bar and can be locked by a screw 80 in any selected position, indicated on a scale 81, in accordance with the striking power required. The lower the contact breaker 79 is placed, the greater the force of the blow; the maximum force corresponding to a bottom position in which the contact breaker cannot be reached by a control cam 82 attached to the cross-head 18. This control cam 82 also carries a pointer 83 the tip of which is in the same plane as the scale 81 already mentioned, and visible on the front side of the housing.

The limit switches 71 and 73 control respectively the electrically controlled valves 44 and 45, while the circuit breaker 79 likewise controls the electric valve 45 independently of the limit switch 73. The switches 71, 73 and the circuit breaker 79 are fitted in recesses 84, 85 provided in the columns of the housing 9 in order to prevent damage or deterioration. The cams 75 and 82 work in slots 86, 87 made in the adjacent side walls of the recesses.

The friction drive of the flywheel 1 is controlled either by the action of two push-button switches 88 and 89 or by actuating a pedal switch 90, these switching elements being arranged, when operated, to close the electric circuit of the electrically controlled valves 45 and 65.

As follows from what has already been said, these controls operate a pressure fluid circuit, pneumatic or oil, distributed by electrically-controlled valves to enable maximum utilization of the capacity of the machine, rapid action, the avoidance of accidents or faulty maneuvers and lessened fatigue of the press operator.

Assuming the drums 22 and 23 to be in rotation and the flywheel-crosshead assembly immobilized at the upper dead-centre position, the action of the machine is as follows:

The operator presses the two switch buttons 88—89 simultaneously, or the pedal switch 90, thus closing the circuit of the electrically controlled valves 45 and 65.

Consequent on the closing of the circuit of the electrically controlled valve 65, pressure fluid is admitted to the brake cylinder 56, causing the brake jaws to be released.

Further, owing to the closing of the circuit of the electrically controlled valve 45, pressure fluid is admitted to the cylinder 37, through the port 43, to the left of the piston 36 (FIG. 2) which consequently at once moves to the right and causes the lever 28—$28^1$ to pivot, thus pressing the drum 22 against the flywheel 1.

Since this drum 22 is rotating in the direction of the arrow 24, the flywheel is constrained to rotate with increasing speed in the direction of the arrow $24^1$, taking with it the screw spindle 4 which, turning in the nut 8, drives the crosshead 18 downwards, to perform the stamping stroke. It should be noted in this regard that during their rotation, which proceeds with increasing speed until tangential velocities of the flywheel and the drum are identical, the flywheel and the screw spindle store up a considerable amount of kinetic energy to which is added the momentum of the masses—flywheel-screw-crosshead-tool—acquired by the descending motion.

When the crosshead reaches the lower end of its stroke, the cam 75 actuates the switch 73 which opens the circuit of the electrically controlled valve 45, thus permitting escape through the port 43 of the pressure fluid previously admitted to the cylinder 37 through the same port, and closes the circuit of the electrically controlled valve 44, thus permitting pressure fluid to pass by the port 42 into said cylinder 37 in such a manner that the piston 36 is now driven towards the left. Consequently, the lever 29—$29^1$ pivots, and the drum 23, which rotates in the direction of the arrow 25, makes contact with the flywheel 1 which is thus constrained to rotate in the direction of the arrow $25^1$ and thus to reverse its motion, which it is able to do since its entire kinetic energy has been absorbed in causing functioning of the tool. Consequently, the screw spindle 4 turns back in the nut 8 and draws the crosshead towards the upper dead-centre.

When this position is reached, the cam 75 actuates the switch 71 which opens the circuit of the electrically controlled valve 44, thus allowing escape of the pressure fluid previously admitted to the cylinder 37 through the port 42. The piston 36 is accordingly moved to the right by the spring 41 until it reaches the neutral or mid-position in which the action of this spring is balanced by that of the spring 40.

Since the limit switch 71 similarly controls the opening of the circuit of the electrically controlled valve 65, the working fluid admitted at the beginning of the cycle through the port 67 to the brake cylinder 56 (FIG. 5) is discharged; the spring 62 then presses the piston 58 towards the right, thus returning the jaws 53—54 into contact with the pulley 16 in such a manner thaat the screw spindle 4 and the flywheel 1 are immobilized at the top dead centre.

The push-buttons 88 and 89 are used to control the machine when performing cold-working operations. The operator places the work-pieces to be stamped in position by hand. To prevent accidents, he has to press both buttons simultaneously. During the downstroke of the crosshead, the release of either button immediately stops the crosshead.

Control by the pedal switch 90 is used for hot-working The operator uses tongs to place the pieces in position. Depression of the pedal starts the action of the crosshead.

In both cases, action on the buttons or the pedal should cease during the upstroke, to obtain automatic stopping in the top dead center in the manner already explained.

A stop-button (not shown) is incorporated in the control circuit. This enables the circuit to be broken at any time.

As has already been said, it is possible in the actual machine to control the force of the working blow by previously readjusting the position of the circuit breaker 79 on the bar 76. Normally, i.e. when the full force of the machine is being used, the circuit breaker 79 is at the bottom of the said bar and the cam 82, which follows the motions of the crosshead, does not make contact with it. If, on the contrary, it is desired to reduce the force of the blow, it is sufficient to move the circuit breaker 79 into the path of the cam 82 into one of the positions marked on the scale 81, corresponding to the striking force required. Then, when the flywheel-screw-crosshead assembly is in its downstroke, the cam 82 will strike and operate the circuit breaker 79 which opens the circuit of the electrically controlled valve 45 in such a manner that the working fluid admitted to the cylinder 37 at the beginning of the downstroke through the port 43 is discharged through the same port and the piston 36 is thus driven to the left by the spring 40 into the neutral position in which the action of this spring is balanced by the pressure of the spring 41. Consequently, the drum 22 loses contact with the flywheel 1, which is no longer driven. It continues, however, to rotate but since its speed is not yet equal to that of the drum 22, and in any case commences to decrease owing to friction, the obvious result is that the striking force attained at the bottom of the downstroke is less than the maximum power which can be developed by the machine.

In the lower dead center the reversal of the motion is performed automatically as already explained.

It is to be understood that the invention is not restricted to the form or embodiment described and illustrated but embraces modifications and that, in the case of a swaging press, the ratio between the diameter of the flywheel and that of one of the driving drums will be greater than in the case of a stamping press.

We claim:

1. A friction driven screw press comprising a press housing, a nut fixed on said press housing, a screw spindle engaging said nut and axially movable in said housing, a crosshead slidably mounted on said press housing and rotatably connected with said screw spindle for common axial displacement therewith, a flywheel having a substantially smooth periphery secured on said screw spindle, two drums rotatably mounted in said press housing with their axes of rotation parallel to said screw spindle, the axial length of each of said drums being at least equal to the range of axial displacement of said flywheel, means for rotating said drums in opposite directions, means for bringing said drums selectively into frictional engagement with said flywheel for rotating the latter but normally disposed in a neutral position, and brake means normally operative upon said spindle but releasing the spindle upon actuation of the press.

2. A friction driven screw press as claimed in claim 1, comprising a casing forming the upper part of said press housing and enclosing said flywheel and said drums, a cover forming the upper wall of said casing and spaced from said nut, and an upper extension on said screw spindle guided in said cover whereby said spindle is firmly supported at two spaced positions.

3. A press according to claim 1 wherein the ratio of the diameter of the flywheel to the diameter of the drums is always less than three to one to obtain a relatively large surface of driving contact.

4. A friction driven screw press comprising a press housing, a nut fixed on said press housing, a screw spindle threaded through said nut and axially movable in said housing, a crosshead slidably mounted on said press housing and rotatably connected with said screw spindle for common axial displacement therewith, a flywheel having a substantially smooth periphery secured on said screw spindle for axial displacement therewith, two swingable supports pivotally mounted in said press housing with their pivoting axes parallel to said screw spindle, a drum having a substantially smooth surface rotatably mounted on each of said supports with its axis of rotation parallel to said screw spindle and swingable to and from driving engagement with said flywheel, the axial length of said drums being at least equal to the range of axial displacement of said flywheel, means for rotating said drums in opposite directions, and means for selectively pivoting said supports to frictionally engage the selected drum with said flywheel but normally retaining the drums out of contact with the flywheel.

5. A friction driven screw press as claimed in claim 3, wherein said means for selectively pivoting said supports includes a cylinder, a double-acting piston in said cylinder, rods connecting said piston to said supports, resilient means urging said piston towards a neutral position for which the position of the supports is such that neither drum engages the flywheel, and means for admitting pressure fluid into said cylinder selectively on either side of said piston.

6. A friction driven screw press as claimed in claim 3, wherein said means for rotating said drums in opposite directions comprise a separate motor for each of said drums.

7. A friction driven screw press as claimed in claim 3, comprising a jaw brake on said screw spindle, resilient means constantly urging said jaw brake in the closing direction, and pressure fluid actuated means operating said jaw brake in the opening direction.

8. In combination, a friction driven screw press, a screw spindle, a flywheel and a crosshead all shift axially upon rotation of the spindle, a pair of oppositely rotating drums having substantially smooth surfaces for alternately driving said flywheel, said drums rotating about axes which are parallel to the axis of the spindle, the axial length of said drums being at least equal to the range of axial displacement of said flywheel, means for bringing said drums alternately into frictional engagement with the flywheel, a control system operatively connected to said means for controlling the latter and comprising a manual switch for actuating said means to move the downwardly driving drum into contact with said flywheel to initiate the press cycle, a first cam on the crosshead, a lower limit switch disposed in the path of movement of and for engagement with said first cam and actuated when so engaged to move the downwardly driving drum out of contact with the flywheel and move the upwardly driving drum into contact with the flywheel to change the direction in which the crosshead is moving, an upper limit switch disposed in the path of movement of and for engagement with said first cam and actuated when so engaged to move the upwardly driving drum out of contact with the flywheel to stop movement of the crosshead upon completion of the press cycle, a second cam on said crosshead, and an adjustable circuit breaking switch disposed in the path of movement of and for engagement with said second cam and actuated when so engaged to move the downwardly driving drum out of contact with the flywheel at least by the time said first cam engages said lower limit switch so that the duration of positive downward driving movement may be regulated, whereby the downward force of the crosshead may be regulated, and brake means for preventing the spindle from rotating and actuated upon engagement of said first cam with said upper switch to normally prevent spindle rotation.

9. A friction driven screw press comprising a press housing including a casing forming the upper part thereof and having a removable cover, a nut fixed on said press housing and spaced from said cover, an axially movable screw spindle threaded through said nut in said housing with the upper portion of said spindle journaled in said cover, a crosshead slidably mounted on said press housing and rotatably connected with said screw spindle for common axial displacement therewith, a flywheel having a substantially smooth periphery secured on said screw spindle for axial displacement therewith, two drums having substantially smooth surfaces and being of an axial length at least equal to the range of axial displacement of said flywheel, means for rotating said drums in opposite directions including a motor for each drum, means for bringing said drums alternately into frictional driving engagement with said flywheel and including two swingable supports pivotally mounted in said press housing with their pivoting axes parallel to said screw spindle and rotatably accommodating said drums with their axes parallel to the screw spindle and swingable to and from driving engagement with said flywheel, a cylinder, a fluid actuated piston in said cylinder, rods connecting said piston to said supports, resilient means urging said piston towards a neutral position in which neither of the drums engages the flywheel, and means for admitting pressure fluid into said cylinder alternately on either side of said piston, and brake means normally operative upon said spindle but releasing the spindle upon actuation of the press and including a pair of jaws pivoted together and surrounding said screw spindle, resilient means constantly urging said jaws together, and pressure fluid actuated means operative to move said jaws apart.

References Cited in the file of this patent

UNITED STATES PATENTS

| | | |
|---|---|---|
| 985,583 | Granger | Feb. 28, 1911 |
| 1,483,919 | Walker | Feb. 19, 1924 |
| 2,770,862 | Miller | Nov. 20, 1956 |

FOREIGN PATENTS

| | | |
|---|---|---|
| 289,285 | Great Britain | Apr. 26, 1928 |
| 295,089 | Germany | Nov. 9, 1916 |
| 754,307 | Great Britain | Aug. 8, 1956 |